United States Patent [19]

Heller et al.

[11] Patent Number: 5,404,562
[45] Date of Patent: Apr. 4, 1995

[54] MASSIVELY PARALLEL PROCESSOR INCLUDING QUEUE-BASED MESSAGE DELIVERY SYSTEM

[75] Inventors: Steven K. Heller, Somerville; Kevin B. Oliveau, Cambridge, both of Mass.

[73] Assignee: Thinking Machines Corporation, Cambridge, Mass.

[21] Appl. No.: 130,324

[22] Filed: Oct. 1, 1993

Related U.S. Application Data

[63] Continuation of Ser. No. 534,598, Jun. 6, 1990, abandoned.

[51] Int. Cl.[6] ........................ G06F 13/00; G06F 15/80
[52] U.S. Cl. .................................... 395/800; 395/200; 395/275; 364/DIG. 1; 364/231.9; 364/229.5
[58] Field of Search ............... 395/200, 800, 250, 375, 395/275, 325; 370/60

[56] References Cited

U.S. PATENT DOCUMENTS

| | | | |
|---|---|---|---|
| 4,412,285 | 10/1983 | Meches | 395/650 |
| 4,598,400 | 7/1986 | Hillis | 370/60 |
| 4,623,996 | 11/1986 | McMillen | 370/60 |
| 4,663,706 | 5/1987 | Allen | 395/200 |
| 4,667,287 | 5/1987 | Allen | 395/800 |
| 4,709,327 | 11/1987 | Hillis et al. | 395/375 |
| 4,933,846 | 6/1990 | Humphrey | 395/325 |
| 4,956,772 | 9/1990 | Neches | 395/650 |
| 4,984,235 | 1/1991 | Hillis et al. | 370/60 |
| 5,148,547 | 9/1992 | Kahle et al. | 395/800 |
| 5,247,613 | 9/1993 | Bromely | 395/200 |

*Primary Examiner*—Alyssa H. Bowler
*Assistant Examiner*—L. Donaghue
*Attorney, Agent, or Firm*—Richard A. Jordan

[57] ABSTRACT

A massively parallel computer system including a plurality of processing nodes under control of a system controller. The processing nodes are interconnected by a plurality of communications links. Each processing node comprises at least one processor, a memory, and a router node connected to the communications links for transferring in a series of message transfer cycles messages over the communications links. The controller enables each processing node to establish a message queue in its memory. The controller further enables storage of messages received by the processing nodes for their respective processors during a message transfer cycle to be stored in the message queue.

11 Claims, 4 Drawing Sheets

MASSIVELY PARALLEL PROCESSOR INCLUDING QUEUE-BASED MESSAGE DELIVERY SYSTEM

This is a continuation of application Ser. No. 07/534,598, filed on Jun. 6, 1990, now abandoned.

INCORPORATION BY REFERENCE

U.S. Pat. No. 4,598,400, issued Jul. 1, 1986, to W. Daniel Hillis, for Method and Apparatus For Routing Message Packets, and assigned to the assignee of the present application, incorporated herein by reference.

U.S. Pat. No. 4,814,973, issued Mar. 21, 1989, to W. Daniel Hillis, for Parallel Processor, and assigned to the assignee of the present application, incorporated herein by reference.

U.S. patent application Ser. No. 07/043,126, filed Apr. 27, 1987, now U.S. Pat. No. 4,984,235, by W. Daniel Hillis, et al, for Method and Apparatus For Routing Message Packets, and assigned to the assignee of the present application, incorporated herein by reference.

U.S. patent application Ser. No. 07/179,020, filed Apr. 8, 1988, now U.S. Pat. No. 5,148,547, by Brewster Kahle, et al., for Method and Apparatus For Interfacing Parallel Processors To A Co-Processor, and assigned to the assignee of the present application, incorporated herein by reference.

FIELD OF THE INVENTION

The invention relates generally to the field of massively parallel computer systems, and more particularly to communications arrangements for transferring data among processing nodes in such systems.

BACKGROUND OF THE INVENTION

A computer system generally includes one or more processors, a memory and an input/output system. The memory stores data and instructions for processing the data. The processor(s) process the data in accordance with the instructions, and store the processed data in the memory. The input/output system facilitates loading of data and instructions into the system, and obtaining processed data from the system.

Most modern computer systems have been designed around a "von Neumann" paradigm, under which each processor has a program counter that identifies the location in the memory which contains its (that is, the processor's) next instruction. During execution of an instruction, the processor increments the program counter to identify the location of the next instruction to be processed. Processors in such a system may share data and instructions; however, to avoid interfering with each other in an undesirable manner, such systems are typically configured so that the processors process separate instruction streams, that is, separate series of instructions, and sometimes complex procedures are provided to ensure that processors' access to the data is orderly.

In Von Neumann machines, instructions in one instruction stream are used to process data in a single data stream. Such machines are typically referred to as SISD single instruction/single data) machines if they have one processor, or MIMD (multiple instruction/multiple data) machines if they have multiple processors. In a number of types of computations, such as processing of arrays of data, the same instruction stream may be used to process data in a number of data streams. For these computations, SISD machines would iteratively perform the same operation or series of operations on the data in each data stream. Recently, single instruction/multiple data (SIMD) machines have been developed which process the data in all of the data streams in parallel. Since SIMD machine process all of the data streams in parallel, such problems can be processed much more quickly than in SISD machines, and at lower cost than with MIMD machines providing the same degree of parallelism.

The aforementioned Hillis patents and Hillis, et al., patent application disclose an SIMD machine which includes a host computer, a micro-controller and an array of processing elements, each including a bit-serial processor and a memory. The host computer, inter alia, generates commands which are transmitted to the micro-controller. In response to a command, the micro-controller transmits one or more SIMD instructions to the array, each SIMD instruction enabling all of the processing elements to perform the same operation in connection with data stored in the elements' memories.

The array disclosed in the Hillis patents and Hillis, et al., patent application also includes two communications mechanisms which facilitate transfer of data among the processing elements. One mechanism enables each processing element to selectively transmit data to one of its nearest-neighbor processing elements. The second mechanism, a global router interconnecting integrated circuit chips housing the processing elements in a hypercube, enables any processing element to transmit data to any other processing element in the system. In the first mechanism, termed "NEWS" (for the North, East, West, and South directions in which a processing element may transmit data), the micro-controller enables all of the processing elements to transmit, and to receive, bit-serial data in unison, from the selected neighbor.

On the other hand, in the global router, the data is transmitted in the form of messages, with each message containing an address that identifies the processing element that is to receive the message. The micro-controller controls all of the processing elements in parallel. In particular, the micro-controller enables the processing elements to transmit messages, in bit serial format, from particular source locations in their respective memories, for delivery in the destination processing elements at particular destination locations in the respective memories. If multiple messages have the same destination processing elements, later-delivered messages will be combined with previously-received messages, and accordingly the messages that will be processed by the serial processors after the message transfer operation will be a function of messages previously received by the processor.

SUMMARY OF THE INVENTION

The invention provides a new and improved communications arrangement for facilitating transfers of data among processing nodes in a processor array.

In brief summary, the invention provides a massively parallel computer system including a plurality of processing nodes under control of a system controller. The processing nodes are interconnected by a plurality of communications links. Each processing node comprises at least one processor, a memory, and a router node connected to the communications links for transferring in a series of message transfer cycles messages over the communications links. The controller enables each processing node to establish a message queue in its memory. The controller further enables storage of messages received by the processing nodes for their respective processors during a message transfer cycle to be stored in the message queue.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 4:
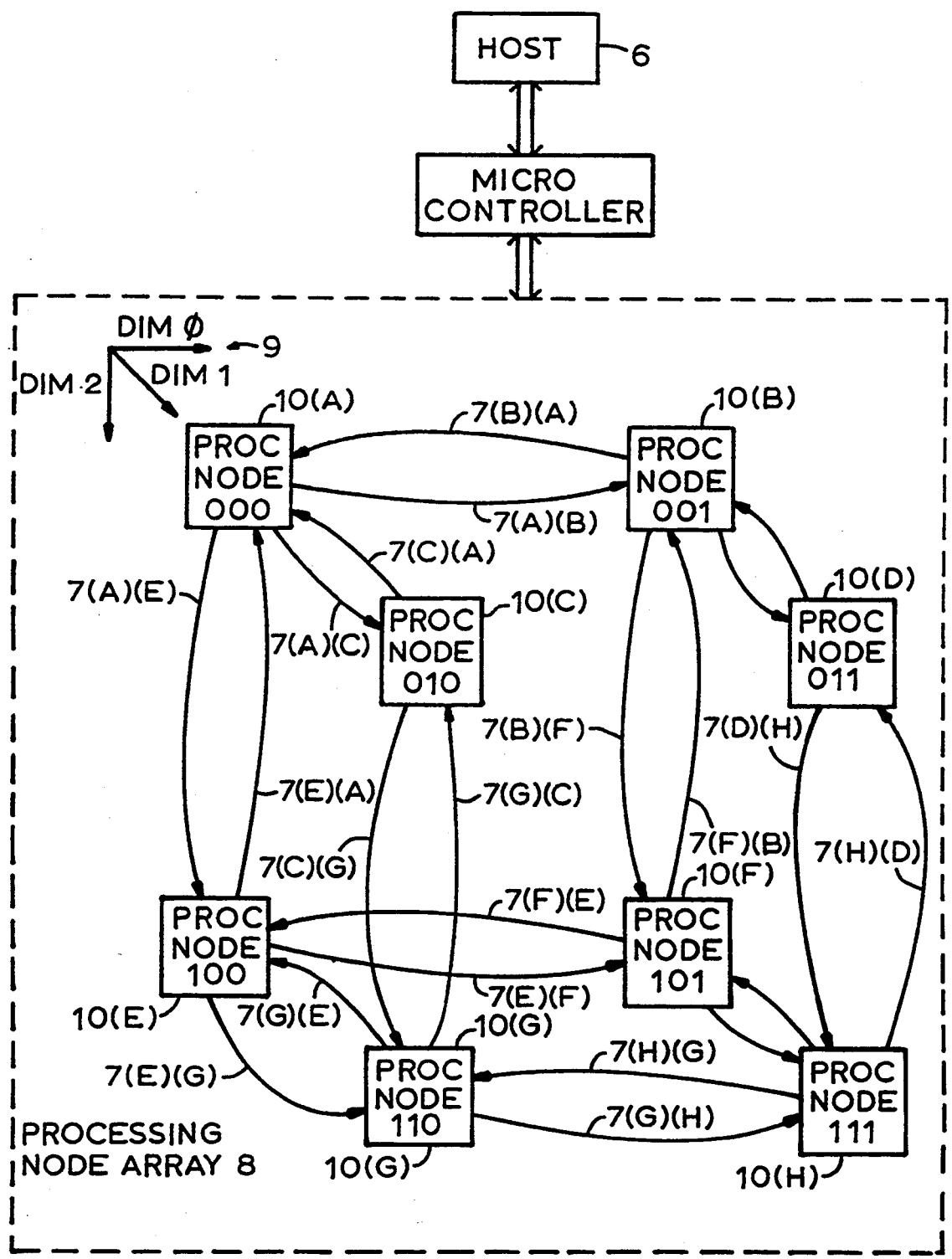
FIG. 4 is a general block diagram of a parallel processing system in which the invention can be used.

FIG. 4 is a block diagram of a portion of a computer system incorporating a communication arrangement in accordance with the invention. The computer system includes a processing node array 8 comprising a plurality of processing nodes, generally identified by reference numeral 10, interconnected by a plurality of communications links $7(x)(y)$. Eight processing nodes 10 are shown in the processing node array 8 depicted in FIG. 1, identified by reference numerals 10(A) through 10(H), but it will be clear from the following that the processing node array 8 may include fewer, or many more, than eight processing nodes 10. The structure of a processing node 10 will be described in detail below in connection with FIG. 1.

In one embodiment, the communications links $7(x)(y)$ interconnect the processing nodes 10 in the form of an "n"-dimensional hypercube. In that embodiment, each communications link $7(x)(y)$ transmits messages from one processing node $10(s)$ (hereinafter referred to as a "source" processing node) to another processing node $10(d)$ (hereinafter referred to as a "destination" processing node). In reference numeral $7(s)(d)$, the index "$s$" identifies the source processing node 10 and the index "$d$" identifies the destination processing node $10(d)$. As used herein, two processing nodes 10 and $10(d)$ will be said to be "adjacent" if there is a pair of communications links $7(s)(d)$ and $7(j)(i)$ which interconnect them.

Figure 1:
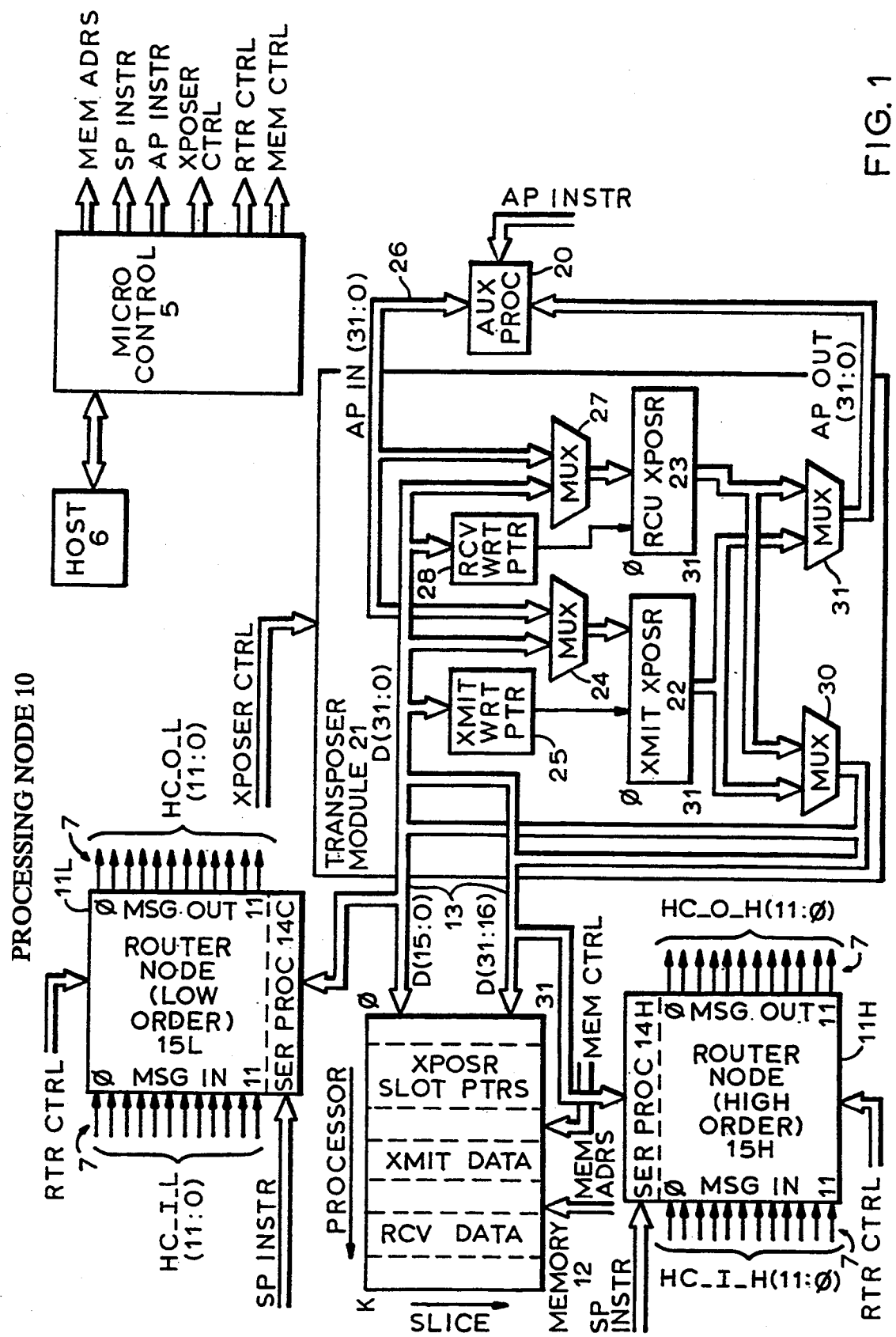
FIG. 1 is a block diagram of a portion of a computer system incorporating a communication arrangement in accordance with the invention.

In the array 8 depicted in FIG. 1, the hypercube forms three dimensions, as suggested by the grid 9 proximate processing node 10(A). As is conventional in connection with hypercubes, the dimensionality of the hypercube and the number of processing nodes are related, with the relation being that the number of dimensions corresponds to the logarithm, to the base two, of the number of processing nodes in the hypercube. Since the eight processing nodes 10 are shown in the processing node array 8 of FIG. 1, the processing nodes 10 can be interconnected in a three-dimensional hypercube. It will be appreciated that the processing node array 8 may include many more processing nodes 10 which may be interconnected by communications links $7(s)(d)$ to form a hypercube; preferably the number of processing nodes 10, in the array 8 is a power of two, which facilitates interconnecting them in a regular hypercube having a number of dimensions corresponding to the logarithm, to the base two, of the number of processing nodes.

The grid 13 has three arrows that are labeled "DIM 0," "DIM 1," and "DIM 2," each of which identifies one of the three dimensions DIM "i" in which "i" identifies the dimension. The directions of the hypercube dimensions, that is, the orientations of the particular communications links $7(s)(d)$ which correspond to the particular hypercube dimensions, differ for each processing node 10, and is determined as follows. As shown on FIG. 1, each processing node 10 is assigned a hypercube address, which is shown in binary form in FIG. 1. Each hypercube address has a number of binary digits corresponding to the number of dimensions in the hypercube. Thus, for example, processing node 10(A) is assigned hypercube address "000," processing node 10(B) is assigned hypercube address "001," and so on, with processing node 10(H) being assigned hypercube address "101." The binary addresses are assigned to the processing nodes 10 so that the binary addresses of adjacent processing nodes differ in one bit location.

In each hypercube address, the right-most binary digit is the low-order digit in the hypercube address, with each successive digit towards the left being a progressively higher order digit, and the left-most binary digit being the high-order digit in the hypercube address. The dimension of the communications link $7(s)(d)$ interconnecting adjacent nodes corresponds to the order of the digit in the binary addresses that is different. Thus, as shown in FIG. 1, the binary addresses of processing node 10(A) and processing node 10(B) differ in the low (zeroth) order digit, and so the hypercube dimension from processing node 10(A) to processing node 10(B) is the DIM 0 dimension zero, as shown in grid 13. Similarly, the binary addresses of processing node 10(A) and processing node 10(C) differ in the next (first) order digit, and so the hypercube dimension from processing node 10(A) to processing node 10(C) is DIM 1 dimension one, also as shown in grid 13. Finally, the binary addresses of processing node 10(A) and processing node 10(E) differ in the high (second) order digit, and so the hypercube dimension from processing node 10(A) to processing node 10(E) is DIM 2 dimension two.

The hypercube dimensions from each processing node 10 to its adjacent nodes are determined in a similar manner. It will be appreciated that, for the communications link $7(s)(d)$ from a processing node 10 to another processing node $10(d)$ that is associated with a particular dimension for the node 10, the communications link $7(j)(i)$ from the processing node $10(d)$ to the processing node 10 is associated with the same dimension. This is a result of the fact that the hypercube addresses of the processing nodes 10 and $10(d)$, for each pair of adjacent nodes, will differ in the same order hypercube address bit, which order determines the dimension for each processing node.

In one particular embodiment, the computer system also includes a micro-controller 5, which is controlled by a host computer 6. To accomplish processing, the host computer 6, in response to a request from an applications or system program being processed thereby, transmits signals representing a command to the micro-controller 5. In response to a command, the micro-controller 5 may transmit a number of signals, as detailed below in connection with FIG. 2, to control the processing nodes 10 of processing node array 8 in parallel.

The processing nodes 10 may also generate status signals, which they couple to the micro-controller 5 to notify it of the status of the operations enabled by the micro-controller. The micro-controller 5 may also provide status signals to the host computer 6 to notify it of the status of the processing of the command. In addition, the computer system may include one or more input/output systems (not shown). The input/output systems may include, for example, mass data storage devices, frame buffers, printers, or the like, which supply data to the processing node array 8 for processing, or which receive data therefrom for storage, display, and so forth.

FIG. 1 is a block diagram of a portion of a computer system incorporating a communication arrangement in accordance with the invention. The computer system includes a micro-controller 5, which is controlled by a host 6 and which, in turn, controls an array of processing nodes, one of which, namely, processing node 10, is shown in FIG. 1. To accomplish processing, the host computer 6 transmits commands to the micro-controller 5. In response to a command, the micro-controller 5 may transmit one or more instructions or other sets of control signals which control processing and other operations, in parallel, to all of the processing nodes concurrently. In addition, a number of processing nodes 10 are interconnected, as described in the aforementioned Hillis patents and Hillis, et al., patent application to facilitate the transfer of data among the processing nodes 10.

With reference to FIG. 1, processing node 10 includes two processing element (PE) chips 11H and 11L (generally identified by reference numeral 11 ) connected to a memory 12 over a data bus 13. In one embodiment, the data bus includes thirty-two data lines D(31:0) which are divided into high-order data lines D(31:16), which connect to PE chip 11H, and low-order data lines D(15:0), which connect to PE chip 11L. Each PE chip 11 includes a set of serial processors, generally identified by reference numeral 14, and a router node, generally identified by reference numeral 15. The serial processors operate in response to SP INSTR serial processor instruction signals from the micro-controller 5 to perform processing on data stored in the memory 12. The micro-controller 5 may enable the serial processors 14(i) to emulate a larger number of virtual processors by essentially providing, in each memory 12, multiple sets of each item of data, one set associated with each virtual processor and providing the SP INSTR serial processor instruction signals multiple times to, in parallel, enable the serial processors 14(i) to process the sets seriatim.

The memory 12 operates in response to SEL MEM ADRS selected memory address signals, which identify storage locations in the memory 12, and MEM CTRL memory control signals which indicate whether data is to be stored in or transmitted from the location identified by the SEL MEM ADRS selected memory address signals. The SEL MEM ADRS selected memory address signals are provided by a multiplexer 16, which operates under control of the MEM CTRL memory control signals from the micro-controller 5. The multiplexer 16 couples either MC MEM ADRS micro-controller memory address signals from the micro-controller 5 or IND MEM ADRS indirect memory address signals to the memory 12 as the SEL MEM ADRS selected memory address signals. The router nodes 15 also operate in response to RTR CTRL router control signals, also from the micro-controller 5, to transmit messages containing data from one processing node 10 to another.

In one embodiment, each PE chip 11 includes sixteen serial processors 14, each of which is associated with one of the data lines of the data bus 13. That is, each serial processor 14(i) receives data bits from, and transmits data bits onto, one of the data lines D(i) ["i" is an integer from the set (31, . . . ,0)]. The memory 12 has storage locations organized into thirty-two bit slices, with each slice being identified by a particular binary-encoded value of the SEL MEM ADRS selected memory address signals from the multiplexer 16. If data is to be transmitted from a slice in memory identified by a particular value of the SEL MEM ADRS selected memory address signals, the memory 12 will transmit bits 3 1 through 0 of the slice onto data lines D(31) through D(0), respectively. On the other hand, if data is to be loaded into a slice in memory identified by a particular value of the SEL MEM ADRS selected memory address signals, the memory 12 will receive bits 31 through 0 of from data lines D(31) through D(0), respectively, and load them into respective bits of the slice.

To perform processing on multi-bit words of data in the memory 12 using the serial processors 14, the micro-controller 5 iteratively enables generation of SEL MEM ADRS selected memory address signals whose values identify successive location in memory 12, and MEM CTRL memory control signals which enable the memory 12 to transmit or store slices of data, and SP INSTR serial processor instruction signals which enable the serial processors 14 to perform the required operations on the bits on their associated data lines D(i). The data in the memory 12 thus may be viewed in two ways, namely, (i) a slice view, identified by the arrow labeled "SLICE," representing fixed-size words of data ("data slices") that will be transmitted from the memory 12 onto the data bus 13, or that will be received by the memory 12 from the data bus 13, at one time in response to the MEM ADRS memory address signals, and (ii) a processor view, identified by the arrow labelled "PROCESSOR," which represents the organization in memory 12 of data which may be accessed by an individual serial processor.

The router nodes 15 of all of the processing nodes 10 are interconnected to facilitate transfer of messages among the processing nodes 10 comprising the array. In one particular embodiment the router nodes are interconnected in the form of a hypercube, as described in the aforementioned Hillis patents. Each router node 15H and 15L, under control of RTR CTRL router control signals from the micro-controller 5, transmits messages to other router nodes 15 on other processing element chips 11 over a plurality of communications links 7, more specifically identified by reference numerals HC_O_H(11:0) (connected to router node 15H) and HC_O_L(11:0) (connected to router node 15L).

In addition, each router node 15H and 15L receives messages from communications links identified by reference numerals HC_I_H(11:0) (connected to router node 15H) and HC_I_L(11:0) (connected to router node 15L). The router nodes 15 determine from the address of each received message whether the message is intended for a serial processor 14(i) on the processing node 10 and, if so, couples it onto a data line D(i) of data bus 13 over which the serial processor 14(i) that is to receive the message accesses the memory 12. The micro-controller 13 enables generation of SEL MEM ADRS selected memory address and MEM CTRL memory control signals to facilitate the storage of the data from the message in the memory 12.

Each message includes an address field and a data field. The data field includes the data to be transferred. The contents of the address field depend upon which of two message transfer modes the computer system is using to transfer messages during the message transfer operation. In a "direct" message transfer mode, the address field of each message includes an address identify that identifies a processing node 10 and serial processor 14(i) that is the intended recipient of the message. In addition, if each serial processor 14(i) is enabled to emulate a plurality of virtual processors, the address field will also provide the identification of a virtual processor. To deliver the message to the addressed serial processor 14(i), the micro-controller enables the data from the message to be stored in processor format in memory 12. In enabling storage of the delivered message data, the micro-controller 5 generates successive MC MEM ADRS micro-controller memory address signals to identify successive locations in memory and MEM CTRL memory control signals that enable the multiplexer 16 to couple the MC MEM ADRS micro-controller memory address signals to the memory 12 as SEL MEM ADRS selected memory address signals.

In an "indirect" message transfer mode, the address field also includes the identification of the processing node 10 and the serial processor 14(i) that is the intended recipient of the data, and in addition includes the location in memory 12 in which the data in the data field is to be stored. In the indirect message transfer mode, the micro-controller enables the portion of the address identifying the location in memory 12 to be coupled to the multiplexer 16 as IND MEM ADRS indirect memory address signals, and generates MEM CTRL memory control signals that enable the multiplexer 16 to couple them as SEL MEM ADRS selected memory address signals to identify the location in memory 12 in which the data is to be stored.

The various communications links HC_O_H(11:0), HC_O_L(11:0), HC_I_H (11:0) and HC_I_L(11:0) connected to each processing node 10 are connected to diverse ones of other processing nodes in a conventional manner to effect the hypercube interconnection. Thus, the outgoing communications links identified by reference numerals HC_O$_{13}$ H(11:0) and HC_O_L(11:0) correspond to various incoming communications links, which may be identified by reference numerals HC_I_H(11:0) and HC_I_L(11:0), at router nodes 15 of other processing nodes 10. In one embodiment, the circuitry of the router nodes 15H and 15L is similar to that described in the aforementioned Hillis patents and Hillis, et al. patent application and will not be described further herein.

The router nodes 15, under control of the micro-controller 5, perform message transfers in one or more message transfer cycles. That is, one message transfer operation, which may be initiated in response to a single message transfer command from the host 6, may require multiple message transfer cycles to complete. In each message transfer cycle, each processing node 10 may transfer a message over each communications link connected thereto to another processing node 10. For each message so transferred, if the destination serial processor 14(i) is not located on the receiving processing node 10, that processing node 10, during the current or a subsequent message transfer cycle, transfers the message over a communications link connected thereto to another processing node 10.

On the other hand, if the destination serial processor 14(i) is located on the receiving processing node 10, the router node 15 that receives the message will deliver the data in the message thereto during this or a subsequent message transfer cycle. That is, the router node 15 couples the data onto the data line D(i) associated with the destination serial processor and stores it in a temporary destination buffer 60 in memory 12. At some later point, the message will be transferred from the temporary destination buffer 60 for storage elsewhere in memory 12, which is identified by the micro-controller 5 if the message transfer operation is in the direct mode, or by an address contained in the message if the message transfer operation is in the indirect mode, from which the data in the message may be processed by the serial processor 14(i). Eventually, all of the messages transferred during the message transfer operation will be in memory 12 and available to the respective destination serial processor(s) 14(i), at which point the message transfer operation will be finished.

The processing nodes 10 may also have an auxiliary processor 20 that processes data in memory 12 that may be organized either in slice format or in processor format, and a transposer module 21 to interface the auxiliary processor 20 to the data bus 13. The auxiliary processor 20 may be, for example, a floating point processor, which may perform arithmetic and logic operations in connection with data in floating point data format. The auxiliary processors 20 and transposer modules 21 in the various processing nodes 10 operate in response to AP INSTR auxiliary processor instruction signals and XPOSER CTRL transposer control signals, respectively, from the micro-controller 5. As is the case with the other control signals provided by the micro-controller 5, the micro-controller 5 transmits the AP INSTR auxiliary processor instruction signals and the XPOSER CTRL transposer control signals to control the auxiliary processor 20 and transposer module 21 of all of the processing nodes 10 concurrently, enabling them to generally perform the same operation concurrently.

The transposer module 21 includes several transposer circuits 22A through 22M (generally identified by reference numeral 22). Each transposer 22 receives input data from an input multiplexer 24 and stores it in one of a plurality of slots identified by the contents of a write pointer register 25. The register 25 may be provided with a pointer prior to storing each item of data in a slot in the associated transposer 22. Alternatively, the register may be loaded with an initial value before loading any data in the transposer 22 and then incremented for each successive item of data loaded therein. The input multiplexer 24, under control of the XPOSER CTRL transposer control signals, selectively couples data signals to the transposer 22 from either the data bus 13 or from a bus 26. Bus 26 carries AP IN (31:0) auxiliary processor in signals representing processed data from the auxiliary processor 20.

The transposers 22 operate in response to the XPOSER CTRL transposer control signals to generate transpositions of the data stored therein. The transposer module 21 also includes two output multiplexers 30 and 31, also controlled by the XPOSER CTRL transposer control signals. Multiplexer 30 receives data signals from the output terminals of transposers 22 and selectively couples the signals from one of the transposers onto the data bus 13. Similarly, the multiplexer 31 receives data signals from the output terminals of transposer 23 and selectively couples the signals from one of the transposers as AP OUT (31:0) signals for transmission to the auxiliary processor. The structure and operation of transposers 22, input multiplexers 24, pointer registers 25 and output multiplexers 30 and 31 are generally described in the aforementioned Kahle, et al., patent application.

The processing node 10 also provides a direct (that is, non-transposing) path between the data bus 13 and the auxiliary processor 20. It will be appreciated that the transposer module 21 facilitates the transposition of data transmitted from the memory 12 in processor format, which would be transmitted serially over separate lines of the data bus 13, into parallel format for processing by the auxiliary processor 20. If the data is stored in memory 12 in slice format, transposition is not required. In addition, the transposer module 21 receives processed data from the auxiliary processor 20 and, if it is required that it be stored in the memory 12 in processor format, transposes the data for transmission serially over predetermined lines of the data bus 13. If the processed data from the auxiliary processor 20 is to be stored in the memory 12 in slice format, the data may be transmitted by the auxiliary processor 20 to the memory 12 over the non-transposing path.

The transposer module 21 also includes several components which provide the IND MEM ADRS indirect memory address signals which are coupled to the multiplexer 16. This indirect memory addressing capability permits the processing nodes 10 to independently provide memory addresses to their own memories 12, so that the addressed locations in the respective memories 12 may differ as among the various processing nodes 10. The transposer module 21 includes an adder 32 which produces the IND MEM ADRS indirect memory address signals in response to BASE signals provided from a base register 33 and OFFSET signals from multiplexer 31. Thus, the OFFSET signals may correspond to the outputs of one of the transposers 22 or the signals on the data bus 13. The base register 33 and maximum offset register 35 are separately provided with values provided over bus 13 in response to appropriate XPOSER CTRL transposer control signals from the micro-controller 5.

The compare circuit 36 determines whether the binary-encoded value of the signals from multiplexer 31 exceeds the binary-encoded value of the MAX OFFSET signals from the register 35, to provide a COMP OK compare status signal to indicate whether the offset provided by the OFFSET signals is less than the maximum offset identified by the maximum offset register 35. If the COMP OK compare status signal indicates that the value of the OFFSET signal exceeds the maximum offset value contained in the maximum offset register 35, the micro-controller 36 may inhibit storage in the location identified by the IND MEM ADRS indirect memory address signals.

In accordance with the invention, the system depicted in FIG. 1 can perform message transfers so that messages destined for a particular serial processor 14($i$) are received and stored in a queue 50, with successive messages received by each serial processor 14($i$) at a processing node 10 being stored in successive slots in a queue slot array 51 in the queue 50. In this operation, the messages are transferred in the indirect transfer mode, with the address field containing an address value that identifies the base of the queue 50 and a serial processor 14($i$), in addition to the identification of the processing node 10. As will be described in greater detail below, in a message delivery phase at the end of each message transfer cycle, the processing nodes 10, under control of the micro-controller:

(i) buffer the message(s) to be delivered in the temporary destination buffer 60 in the memory 12;

(ii) identifies the next slot in the array associated with the destination serial processor(s) 14 in which data from a message in the temporary destination buffer 60 can be stored; and (iii) stores the data from the message in the identified slot.

In addition, the processing nodes 10 maintain, in a queue count array 52, a running total of the number of messages received for each serial processor 14($i$). At the beginning of a message transfer operation, the queue 50 is established to have a selected maximum number of slots for each serial processor 14($i$). If more messages are received for a serial processor 14($i$) than the maximum number, the additional messages are overwritten in the last slot. However, the queue count array 52 identifies the actual number of messages received for each serial processor 14($i$) during the message transfer operation. Thus, each serial processor 14($i$) can determine whether the number of messages that were actually received during the message transfer operation exceeds the number stored in the queue 50.

A benefit of the invention is that it facilitates reception and storage of a number of messages for each serial processor 14($i$) during a message transfer operation. Thus, the processing can be performed on received messages by the serial processors 14 after they have been received. In addition, the invention facilitates maintenance of a count of the total number received for each serial processor, unlike the message transfer arrangements described in the Hillis patents and Hillis, et al., patent application. Thus, the serial processors 14 can determine whether they have all of the messages which were transmitted to them during the message transfer operation.

Figure 2:
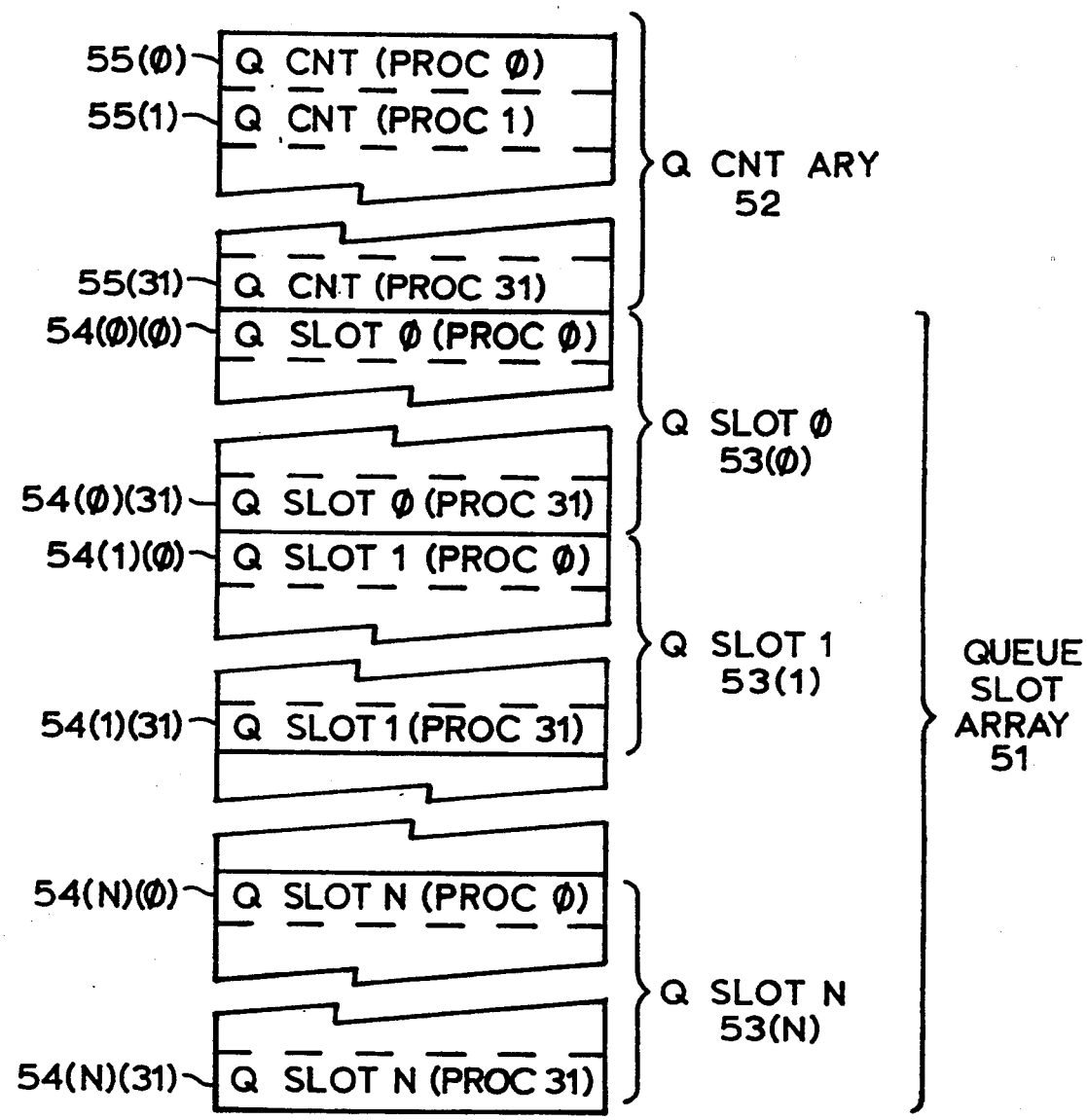
FIG. 2 is a diagram of a queue used in the new communication arrangement.

Before proceeding further, it would be helpful to explain the structure of the queue 50, which is shown in detail in FIG. 2. With reference to FIG. 2, the queue 50 includes the queue slot array 51 and queue count array 52. The queue slot array 51 includes one or more queue slots 53(0) through 53(N) [generally identified by reference numeral 53($s$)], the number "N" of queue slots 53($s$) being determined by a maximum items value in the message transfer command from the host 6. Each queue slot 53($s$), in turn, includes a number of processor slots, generally identified by reference numeral 54($s$)($i$). The processor slots 54($s$)($i$) in successive queue slots 53($s$) can store message data for messages received for the associated serial processor 14($i$) during successive message transfer cycles. In the reference numeral for the processor slot "54($s$)($i$)" in FIG. 2, the index "s" corresponds to the index of the slot, and index "i" identifies the serial processor 14($i$) associated with the processor slot 54($s$)($i$).

The queue count array 52 also includes a plurality of count slots generally identified by reference numeral 55($i$), each associated with a serial processor 14($i$). Thus, in the embodiment depicted in the Figs., in which each processing node 10 includes thirty-two serial processors 14, the index "i" may extend from zero to thirty-one. Each count slot $55(i)$ in the queue count array 52 contains a message count value that identifies the number of messages received and stored in the queue slots 53 for the associated serial processor $14(i)$. Accordingly, until the message count value in a count slot exceeds the maximum item value from the host 6, the message count value contained in the count slot $55(i)$ associated with a serial processor $14(i)$ also points to the queue slot $53(s)$ which contains the last message received for the serial processor $14(i)$.

In one particular embodiment, the various count slots $55(i)$ comprising the queue count array, and the processor slots $54(s)(i)$ comprising the slots $53(s)$ of the queue slot array 51, are stored in memory 12 in slice format, and each slot comprises one slice. Thus, each slot is identified by one value of the SEL MEM ADRS selected memory address signals from the multiplexer 16 (FIG. 1). In that embodiment, the amount of message data that may be transferred in a single message is limited by the number of bits in a slice, which is thirty-two in the same embodiment. In slice format, the count values in queue count array 52 and the message data in queue slot array 51 may be processed directly (that is, without transposition by a transposer 22 in the transposer module 21) by the auxiliary processor 12.

Alternatively, the message data in the queue slots $53(s)$ of the queue slot array 51 may be transposed, by a transposer 22 in transposer module 21, to provide the message data in processor format for processing by the serial processors 14. In addition, the message count values in the count slots $55(i)$ of the queue count array 52 may be transposed by transposer module 21 for processing by the serial processors 14. In the embodiment depicted in the FIGS., the number of processor slots $54(s)(i)$ in a queue slot $53(s)$ equals the number of data bits in a slice in memory 12, and the transposer module 21 can transpose an entire queue slot $53(s)$ in one transpose operation. Similarly, the number of count slots $55(i)$ in the queue count array 52 is the same, and the transposer module 21 can transpose the entire queue count array 52 in one operation. The aforementioned Kahle, et al., patent application describes the transposition operation performed by the transposer module 21 in detail.

It will be appreciated that, in other embodiments, a message may contain more or less than the number of data bits in a slice in memory. If the number of bits of data in a message is less than the number bits in a slice, the data from each message may be accommodated in a single slice. On the other hand, if the number of bits of data in a message is greater than the number of bits in a slice, the message data may be distributed over several slices in a number of ways. Preliminarily, it will be appreciated that, during a message transfer operation, the number of bits of message data will be the same from message to message. Accordingly, the number of slices that will be required to accommodate the data received from each message will be constant throughout the message transfer operation.

With that proviso, the slices may be organized in queue 50 in several ways. In one organization, the queue 50 may essentially comprise a number of sequential queue slot arrays 51, the number corresponding to the number of slices required to store all of the bits of a message transferred during the message transfer operation. In that organization, each queue slot array has the same number "N" of queue slots, corresponding to the maximum items value, and each queue slot has a number of processor slots corresponding to the number of serial processors $14(i)$ in a processing node 10. Message data for a message addressed to a particular serial processor $14(i)$ is stored in the queue in that serial processor's processor slots in the corresponding queue slot of the successive queue slot arrays. Thus, for example, the message data from the "j-th" message addressed to a serial processor $14(i)$ will (if "j" is less than or equal to the maximum items value) be stored in the "i-th" processor slot in the "j-th" queue slot in the successive queue slot arrays, with the first "n" bits (where "n" is the number of bits in a slice) being stored in the first queue slot array, the second "n" bits in the second queue slot array, and so forth.

In another organization, the slices required for each message may be consecutive in the queue slot array 51. That is, the slices required for each processor slot $54(s)(i)$ may have successive address values in memory 12. Thus, to store message data in successive slices, the address represented by the SEL MEM ADRS selected memory address is incremented by one for each successive slice. Alternatively, each slot $53(s)$ may be divided into consecutive slice arrays (not shown), each slice array having successive slices for the successive serial processors $14(i)$ in the processing node. In that case, the successive slices for each serial processor $14(i)$ have addresses displaced by the number of serial processors 14 in the processing node, which is thirty-two in the embodiment described herein. In that organization, the address represented by the SEL MEM ADRS selected memory address is incremented by thirty-two for each successive slice. It will be appreciated that, while having successive slices for a processor slot $54(s)(i)$, instead of having successive slice arrays, may provide for simpler addressing while storing the message data, using successive slice arrays may provide simpler transposing of the message data in the multi-slice processor slots $54(s)(i)$ by the transposer module 21.

Figure 3:
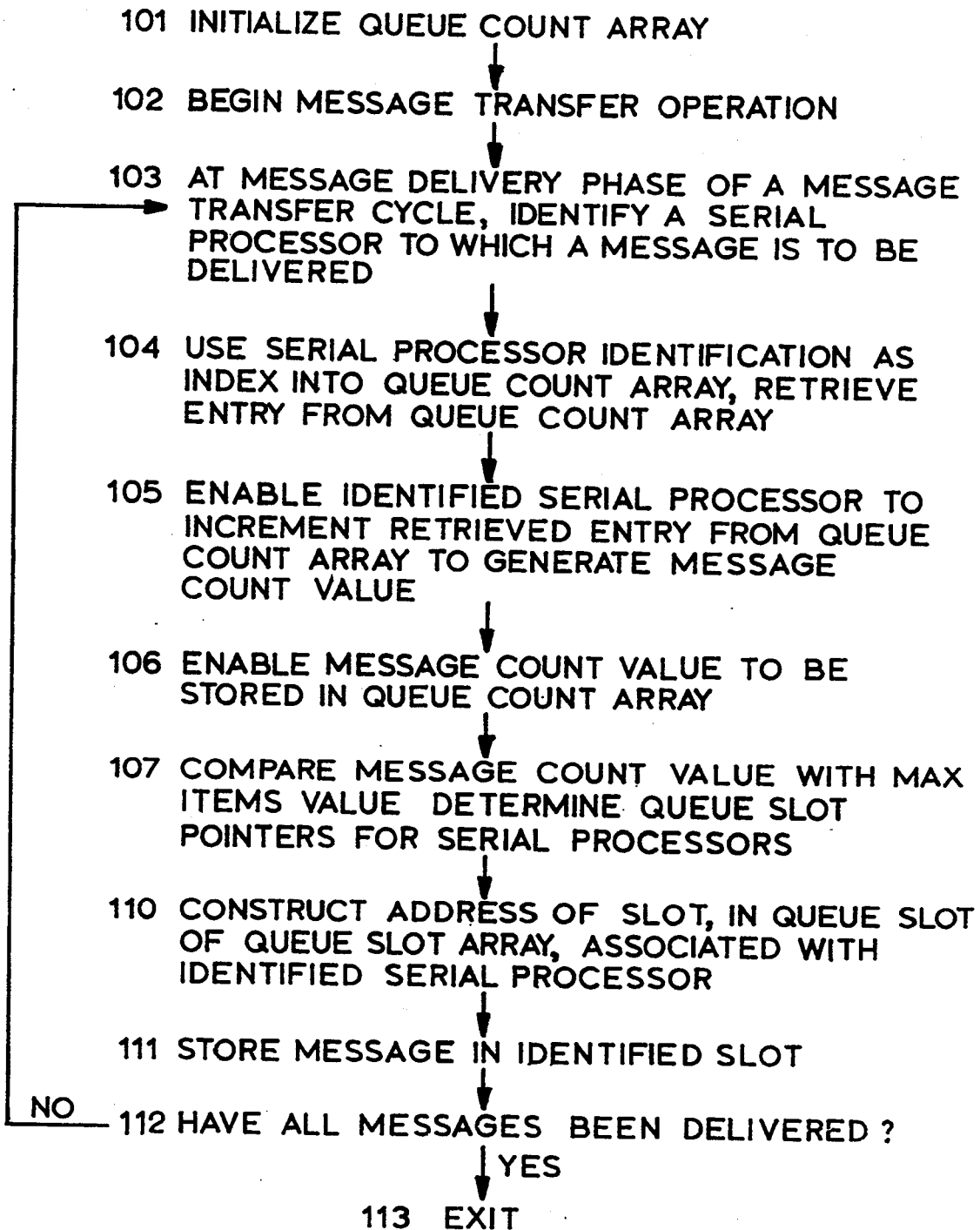
FIG. 3 is a flow diagram useful in understanding the operation of the new communication arrangement.

With this background, the operations performed in connection with the new communications arrangement will be described in detail in connection with FIGS. 1 and 2 and the flow-chart in FIG. 3. With reference in particular to FIG. 3, the micro-controller 5 first enables the processing nodes 10 to initialize all of the count slots $55(i)$ of their queue count arrays 52 (step 101). In one embodiment, the micro-controller 5 generates SP INSTR serial processor instruction signals, MC MEM ADRS micro-controller memory address signals and MEM CTRL memory control signals that, in parallel, that enable:

(1) the serial processors 14 to transmit value "zero" onto the respective data lines D(31:0) of data bus 13, (2) (in the case of the MC MEM ADRS micro-controller memory address signals) identification of the slices of memory 12 containing the successive count slots $55(i)$, and (3) (in the case of the MEM CTRL memory control signals) the multiplexer 16 to couple the MC MEM ADRS micro-controller memory address signals to the memory 12 as the SEL MEM ADRS selected memory address signals and the memory 12 to store the values represented by the signals on the data lines D(31:0) of data bus 13.

It will be appreciated that in this operation each serial processor $14(i)$ will provide one bit for each initial value stored in the count slots $55(i)$ of the queue count array 52. Alternatively, each serial processor may provide all of the bits for its count slot 55(i). In that case, the initial values will be in processor format and the micro-controller 5, after enabling the operation as described above, may enable the transposer module 21 to perform a transpose operation in connection with the initial contents of the queue count array 52 to transpose the array 52 to slice format, with the transposed values being stored in the queue count array 52.

After the queue count array 52 has been initialized (step 101), the micro-controller 5 initiates the message transfer operation (step 102) to transfer messages in a series of one or more message transfer cycles. Each message transfer cycle includes a message delivery phase in which the micro-controller 5 enables, in parallel, each processing node 10 to store data in messages (i) which were received at the processing node 10 during the message transfer cycle and (ii) whose destinations are serial processors 14 on the processing node 10, in the node's memory 12, thereby making the message data available to the destination serial processors. In the new communication arrangement, the message delivery phase includes steps 103 through 107 and 110 through 112 (FIG. 3). In the message delivery phase, the micro-controller 5 first generates RTR CTRL router control signals that enable the router nodes 15 to couple data onto the data bus 13, and MC MEM ADRS micro-controller memory address signals and MEM CTRL memory control signals that enable the data to be stored in the temporary destination buffer 60 of the memory 12.

After buffering messages in the temporary destination buffer 60 of memory 12 during a message transfer cycle, the micro-controller 5 initiates a message delivery operation during which it enables the storage of message data from a message in a slot 54(s)(i) in the queue 50 identified in the address field of the message. In that operation, after identifying the queue 50, the micro-controller 5 uses the identification of the serial processor 14(i) identified in the address field of the message (step 103) to, in turn, identify the count slot 55(i) whose message count value is to be incremented (step 104). The micro-controller 5 then enables the identified serial processor 14(i) (in step 103) to increment the message count value in its associated count slot 55(i) (step 105) and the memory 12 to store the incremented message count value in the queue count array 52 (step 106).

More specifically in connection with steps 103 through 106, when a message is to be delivered to a serial processor 14(i) identified in the address field of the message in the temporary destination buffer 60, a message present control flag (not shown) is set for the serial processor 14(i), and the message present control flags for the other serial processors 14(i) are cleared. The condition of the message present control flag of a serial processor 14(i) controls subsequent processing by the serial processor 14(i) during the message delivery phase. Since the count slots 55(i) are in slice format in memory 12, the micro-controller 5 enables the memory 12 to transmit the message count value from the appropriate slot 55(i) to the transposer module 21, and the transposer module 21 to perform a transposition operation and provide the message count value in serial format to the serial processor 14(i) whose message data is to be delivered.

In that operation, the micro-controller 5 enables address value identifying the base of the queue 50 to which the message is to be delivered to be transferred to the base register 33 of the transposer module 21 and initiates a series of iterations, during each iteration enabling adder 32 to generate signals representing successive incrementations of the value in the base register 33. The output of adder 32 comprise IND MEM ADRS indirect memory address signals which iteratively identify the slices in memory 12 containing the slots 55(i) of the queue count array 52. During each iteration, the micro-controller 5 also generates MEM CTRL memory control signals that (a) enable the multiplexer 16 to couple the IND MEM ADRS indirect memory address signals to the memory 12 as SEL MEM ADRS selected memory address signals and (b) enable the memory 12 to transmit the contents of the locations addressed by the SEL MEM ADRS selected memory address signals over the data bus 13 to the transposer module 21. When the message count value of the count slot 55(i) is on the data bus 13, the micro-controller 5 generates XPOSER CTRL transposer control signals to enable the message count value to be stored in a transposer 22 in the transposer module 21.

After the message count values of the queue count array 52 have been loaded into a transposer 22 in transposer module 21, the micro-controller 5 iteratively generates (a) XPOSER CTRL transposer control signals to enable the transposer 22 to couple bits comprising the transpose of the values therein, comprising the transposes of the values from the slots 55(i) previously loaded therein, onto the data bus 13 to the associated serial processors 14(i) and (b) SP INSTR serial processor instruction signals to enable the serial processor 14(i) whose message present control flag is set to increment its message count values. In one embodiment, including serial processors 14 as described in connection with the aforementioned Hillis, et al., patent application, the incrementation can be accomplished as follows. In the serial processors 14 described in the Hillis, et al., patent application, whether a serial processor 14(i) performs an operation enabled by the SP INSTR serial processor instruction signals can be made to depend on the condition(s) of flag(s) separately maintained by each serial processor 14(i). In effect, all of the serial processors perform the operation enabled by the SP INSTR serial processor instruction signals to generate processed data, but they couple either the input data bits or the processed data bits, depending on the condition(s) of the flag(s), to their respective outputs. Thus, in this case, the serial processor 14(i) whose message present control flag is set transmits bits comprising the incremented message count value onto its data line D(i) of data bus 13, and otherwise transmits the input data bits (which correspond to the original message count value) onto its data line D(i) if its message present control flag is clear.

Contemporaneously, the micro-controller 5 generates XPOSER CTRL transposer control signals that enable the bits output from the serial processors 14 onto the respective lines D(i) of data bus 13 to be stored in another transposer 22 in the transposer module 21. After the serial processors 14 have processed all of the bits comprising the values of the respective count slots 55(i), the micro-controller 5 generates XPOSER CTRL transposer control signals that enable the second transposer 22 to perform a transpose operation to iteratively transmit its contents onto data bus 13. It will be appreciated that the contents transmitted during successive iterations are the message count values for successive count slots 55(i) in the queue count array 52. Accordingly, the micro-controller 5, during successive iterations, enables the adder 32 to generate signals representing successive incrementations of the value in the base register 33, which still contains a value pointing to the base of queue 50. The output of adder 32 provides IND MEM ADRS indirect memory address signals that identify locations of successive count slots 55($i$) in the memory 12. During each iteration, the micro-controller generates MEM CTRL memory control signals that (a) enable the multiplexer 16 to couple the IND MEM ADRS indirect memory address signals to the memory 12 as SEL MEM ADRS selected memory address signals and (b) enable the memory to store the data on the data bus 13 in the location identified by the SEL MEM ADRS selected memory address signals.

After enabling incrementation of the message count value in the count slot 55($i$) of the queue count array 52 associated with the serial processor 14($i$) to which the message data in the temporary destination buffer is to be delivered (step 106), the micro-controller 5 initiates a series of operations (steps 107, 110 and 111) in which it
(i) enables generation of a pointer to the queue slot 53($i$) in the queue slot array 51 in which the message data is to be stored;
(ii) enables generation of an address in memory 12 of a processor slot 54($s$)($i$), using the generated pointer; and
(iii) enables the message data to be copied from the temporary destination buffer 60 to the processor slot 54($s$)($i$) for storage.

To accomplish these operations, the micro-controller 5 first enables the serial processor 14($i$) to which message data is to be delivered to perform a comparison operation to determine whether the just-computed message count values for each serial processor 14($i$) exceed the maximum queue slots value (step 107). The maximum queue slots value identifies the maximum number of queue slots 53($i$) in the queue slot array 51. In addition, the micro-controller 5 enables the serial processor 14 constituting the destination for a received messages to generate a queue slot pointer that points to a queue slot 53($i$) in which the data from the message is to be stored. In this operation, the micro-controller 5 enables the serial processor 14($i$) to generate a value comprising the lesser of the message count value and the maximum queue slots value, the result being the queue slot pointer.

After enabling the serial processor 14($i$) to which a message is to be delivered to generate a queue slot pointer (step 107), the micro-controller 5 enables the serial processors 14 to generate an address for the queue slot 53($i$), and particularly of the processor slot 54($s$)($i$), in which the data from the message to be delivered is to be stored (step 110). The micro-controller 5 then enables the processing node 10 to transfer the message data from the temporary destination buffer 60 to the appropriate queue slots 53($i$) for storage (step 111), ending the message delivery phase.

More specifically, after the appropriate message count value has been incremented in step 106, the micro-controller 5, in connection with step 107, enables the serial processor identifier from the address field of the message being delivered to be transferred over bus 13. The micro-controller 5 generates XPOSER CTRL transposer control signals that enables (i) a pointer register 25($j$) associated with one of the transposers 22($j$) to store the serial processor identification value, (ii) the multiplexer 31 to couple the serial processor identification value as OFFSET signals and (iii) the adder 32 to generate a value comprising a sum of the value in the base register 33 and the value represented by the OFFSET signals, which sum points to the count slot 55($i$) of the serial processor to which the message data is to be delivered. The output of adder 32 comprise the IND MEM ADRS indirect memory address signals coupled to the multiplexer 16.

Contemporaneously, the micro-controller 5 generates MEM CTRL memory control signals that enable (a) the multiplexer 16 to couple the IND MEM ADRS indirect memory address signals as the SEL MEM ADRS selected memory address signals to the memory 12 and (b) the memory 12 to transfer the contents of the addressed count slot 55($i$) onto the data bus 13, and XPOSER CTRL transposer control signals to enable the transposer module 21 to load the signals on the data bus 13 into a transposer 22 in the transposer module 21, in the location identified by the pointer register 25. It will be appreciated that the count value from the count slot 55($i$) is stored in a location in the transposer 22 in which upon transposition it will be transmitted onto bus 13 on the line D(i) associated with the serial processor 14($i$). After enabling the count value of all of the slot 55($i$) to be loaded into the transposer 22, the micro-controller 5 generates XPOSER CTRL transposer control signals which enable the transposer 22 to couple the transpose of the contents onto the data bus 13. It will be appreciated that the transposer 22 iteratively transmits onto line D(i) of the data bus 13 bits comprising the count value the previously loaded count slot 55($i$). Contemporaneously, the micro-controller 5 generates SP INSTR serial processor instruction signals that enable the serial processor 14 whose message present control flag is set to (a) receive the bits from respective line D(i) of the data bus 13, (b) perform a bit-by-bit comparison operation between the count value and the maximum items value, and (c) transmit a result bit onto line D(i) of the data bus 13. In the comparison operation, if the serial processor 14($i$) determines that a bit of the count value has a greater value than the bit of the maximum items value, the serial processor transmits that and successive bits from the maximum items value as the result bit. The successive result bits from the serial processor 14($i$) correspond to the queue slot pointer for the serial processor 14($i$). The value represented by the successive result bits from each serial processor 14($i$) has a maximum corresponding to the maximum items value.

After the serial processor 14($i$) transmits a bit of the queue slot pointer onto the line D(i) of the data bus 13, the micro-controller 5 generates MC MEM ADRS micro-controller memory address signals that identify a temporary buffer in which the queue slot pointer is buffered, and MEM CTRL memory control signals that (a) enable the multiplexer 16 to couple the MC MEM ADRS micro-controller memory address signals to the memory 12 as SEL MEM ADRS selected memory address signals and (b) enable the memory 12 to store the bit in the addressed location. The micro-controller 5 enables the bits in successive iterations to be stored in successive locations in memory 12. It will be appreciated that the queue slot pointer is stored in memory 12 in processor format.

At this point, the queue slot pointer effectively points to the queue slot 53($i$) in which data from a received message is to be stored, but it is not the memory addresses of the particular processor slot 54($s$)($i$). The micro-controller 5 next enables the serial processors to construct the address (step 110). The micro-controller 5 generates MC MEM ADRS micro-controller memory address signals that iteratively identify the successive locations in memory 12 in which the bits of the queue slot pointers are stored, and MEM CTRL memory control signals that (a) enable the multiplexer 16 to couple the MC MEM ADRS micro-controller memory address signals to the memory 12 as SEL MEM ADRS selected memory address signals and (b) enable the memory 12 to transmit the bits from the addressed locations onto the respective lines D(31:0) of the data bus 13. The bits of the queue slot pointer are coupled onto the line D(i) associated with the serial processor 14(i) to which the message is to be delivered.

Contemporaneously, the micro-controller 5 generates SP INSTR serial processor instruction signals that enable the serial processor 14(i) whose message present control flag is set to perform a computation using the bits of the queue slot pointer to generate the memory address of the processor slot 54(s)(i) into which the message data is to be stored. In this operation, the serial processor 14(i) effectively:

(i) multiplies the queue slot pointer by the value thirty-two, since each queue slot 53(i) includes thirty-two processor slots, and (ii) adds to the sum computed in (i) the serial processor identification from the address field of the message to be delivered, which corresponds to the index (i) of the serial processor's processor slot 54(s)(i) in the queue slots 53(i).

For each serial processor 14(i), the result is the offset into the queue 50 of the processor slot 54(s)(i) in which message data received for the serial processor 14(i) is to be stored. The micro-controller 5 enables the offset to be transmitted to the transposer module 21 to provide the OFFSET signal input to adder 32. It will be appreciated that the multiplication step [step (i) immediately above] can be performed by shifting the bits comprising the queue slot pointer up by five, which can be performed by suitable selection of the addresses used to address the buffer in which the queue slot pointers are stored.

After the serial processor 14(i) has computed the offset of the processor slot 54(s)(i) into which the data from the message to be delivered will be stored, the micro-controller 5 enables the message data to be stored in the processor slots (step 111). In this operation, the micro-controller generates XPOSER CTRL transposer control signals that enable the adder 32 to transmit the sum of the value in the base register 33, which corresponds to the address of the base of the queue 50, and the value represented by the OFFSET signals, which corresponds to the offset of the processor slot 54(s)(i) into the queue 50, as IND MEM ADRS indirect memory address signals. The micro-controller 5 also transmits MEM CTRL memory control signals that (a) enable the multiplexer 16 to couple the IND MEM ADRS indirect memory address signals to the memory 12 as SEL MEM ADRS selected memory address signals, and (b) enable the data from the message to be delivered to be moved from the temporary destination buffer 60 to the location identified by the SEL MEM ADRS selected memory address signals, that is, to the processor slot 54(s)(i).

After completing the message delivery phase of a message transfer cycle, the micro-controller 5 can determine in a conventional manner whether additional message transfer cycles are required to deliver all messages (step 112) and if so return to step 103. On the other hand, if the micro-controller 5 determines in step 112 that all messages have been delivered, it exits the message transfer operation.

It will be appreciated that a number of the operations described above are for the purpose of generating appropriate transpositions of data and values. Some of these transposition operations may not be necessary either if the data and values are stored in one or the other of the processor or slice formats.

In addition, it will be appreciated that, while the new communications arrangement has been described in connection with a massively parallel processor having a hypercube interconnection system, the arrangement can be implemented in massively parallel processors having interconnection systems of any form.

As noted above, the invention can provide a number of benefits. Most notably, the invention facilitates the reception of message data from a number of messages for each of the serial processors 14(i) during a message transfer operation. In addition, the invention facilitates identification of the number of messages received for each serial processor 14(i) during a message transfer operation. The latter may help in ensuring that each serial processor 14(i) has message data for each message received for it during a message transfer operation. If, for example, the value in a count slot 55(i) associated with a serial processor 14(i) in any processing node 10 is greater than the maximum items value provided by the host 6, data from at least one message will have been overwritten in that processing node, or the incoming message is not stored in the queue. If that occurs, the micro-controller 5 can repeat the message transfer operation with a larger queue 50 or provide a larger queue 50 when the program including the message transfer operation is repeated, so as to accommodate all of the message data. Accordingly, the size of the queue 50 need not be known a priori, but instead can be determined and modified based on experience in executing the program.

In addition, identification of the number of messages received during a message transfer operation can be helpful in diagnostic operations. For example, if the number of messages to be received by each serial processor 14(i) during a message transfer operation during execution of a diagnostic program is known a priori, the expected numbers can be compared to the actual values, as contained in the queue count array 52 following the message transfer operation. The results of the comparison can verify whether the message transfer mechanism, including the router nodes 15 and communications links, are operating properly.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A massively parallel computer system comprising:
A. a plurality of processing nodes, each processing node including at least one processor and a memory, each processing node receiving processor control signals for performing processing operations in connection with data in said memory and for generating and receiving messages;

B. a communications network including a plurality of router nodes interconnected by communications links, at least some of the router nodes being connected to said processing nodes, the router nodes being responsive to routing control signals to receive messages from said processing nodes and transfer the messages over the communications links to said processing nodes which are to receive the messages; and C. a controller connected to all of said processing nodes and said router nodes for
   i. generating processor control signals for transmission to all of said processing nodes in parallel to control said router nodes to:
      (a) establish in parallel a message queue in the processing nodes+ respective memories;
      (b) generate messages in parallel for transmission to said router nodes;
      (c) receive messages in parallel from said router nodes; and
      (d) append in parallel said received messages to the processing nodes' respective message queues; and
   ii. generating routing control signals to enable said router nodes to transfer messages generated by the processing nodes over said communications links, the messages to be received by the messages' respective destination processing nodes;
   thereby to enable the processing nodes to, in parallel, append respective successively-received messages to respective queues.

2. A system as defined in claim 1 in which the message queue in each processing node includes a queue count portion for storing a message count, said controller generating processor control signals for enabling said processing nodes to increment the message count in their respective queue count portions in response to receipt of a message.

3. A system as defined in claim 2 in which each processing node includes a plurality of processors, and in which each message identifies a processor, said controller enabling each queue count portion to include a plurality of count slots, each count slot being associated with a processor, said controller generating processor control signals enabling the processors to, in parallel in response to receipt of a message, increment the message count in their respective count slot.

4. A system as defined in claim 1 in which, in the message queue in each processing node, a queue slot portion includes a plurality of queue slots, said controller generating processor control signals enabling received messages to be stored in successive queue slots in said queue slot portion.

5. A system as defined in claim 4 in which the message queue in each processing node further includes a queue count portion for storing a message count, said controller generating processor control signals enabling the processors of processing nodes which have received messages to, in parallel, increment the message counts in said respective queue count portions.

6. A system as defined in claim 5 in which the controller generates router control signals that enable the router nodes to, in parallel, use the message count in the queue count portion to identify a slot in the respective message queue in which a received message is stored.

7. A system as defined in claim 6 in which each processing node further includes a maximum slot count value identifying a maximum number of queue slots in the processing node's message queue, the controller generating processor control signals enabling said processor nodes to, in parallel in response to receipt of a message, further use the maximum slot count value in identifying a slot in the message queue in which a respective received message is stored.

8. A system as defined in claim 7 in which the controller generates processor control signals to enable said processor nodes to, in parallel in response to receipt of a message, use a value corresponding to a minimum of the respective message count and the respective maximum slot count value to identify a slot in the message queue in which a respective received message is stored.

9. A system as defined in claim 5 in which each processing node includes a plurality of processors, and in which each message identifies a processor, each queue count portion further including a plurality of count slots, each count slot being associated with a processor, said controller generating processor control signals enabling the processor nodes to, in parallel in response to receipt of, respective messages increment the message count in the count slot associated with the processors identified by the received messages.

10. A system as defined in claim 9 in which each queue slot also includes a plurality of processor slot, each processor slot in each queue slot being associated with a processor on the respective processing node, said controller generating processor control signals enabling, in parallel, each message received by the processor nodes to be stored in the processor slot associated with the processor identified in the message, in the queue slot identified by the count slot associated with the processor identified in the message.

11. A system as identified in claim 10 in which each processor slot is identified by a memory address, said controller generating processor control signals enabling, the processing node to, in parallel, generate addresses to control storage of messages in each memory in response to their respective message counts in the queue count portion.

* * * * *